(12) United States Patent
Candelaria

(10) Patent No.: US 9,213,612 B2
(45) Date of Patent: Dec. 15, 2015

(54) METHOD AND SYSTEM FOR A STORAGE AREA NETWORK

(75) Inventor: James Candelaria, Branchburg, NJ (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 605 days.

(21) Appl. No.: 13/121,605

(22) PCT Filed: Sep. 29, 2009

(86) PCT No.: PCT/US2009/058905
§ 371 (c)(1),
(2), (4) Date: Aug. 12, 2011

(87) PCT Pub. No.: WO2010/037147
PCT Pub. Date: Apr. 1, 2010

(65) Prior Publication Data
US 2011/0289261 A1 Nov. 24, 2011

Related U.S. Application Data

(60) Provisional application No. 61/100,953, filed on Sep. 29, 2008.

(51) Int. Cl.
*G06F 12/00* (2006.01)
*G06F 11/20* (2006.01)
(Continued)

(52) U.S. Cl.
CPC ............ *G06F 11/2089* (2013.01); *G06F 11/20* (2013.01); *G06F 3/067* (2013.01); *G06F 3/0617* (2013.01); *G06F 3/0656* (2013.01); *G06F 3/0688* (2013.01); *G06F 12/0866* (2013.01); *G06F 2201/85* (2013.01);
(Continued)

(58) Field of Classification Search
None
See application file for complete search history.

(56) References Cited

U.S. PATENT DOCUMENTS 4,993,030 A 2/1991 Krakauer et al.
5,263,003 A 11/1993 Cowles et al.
(Continued)

FOREIGN PATENT DOCUMENTS

EP 0613151 8/1994
GB 2437846 9/2008
(Continued)

OTHER PUBLICATIONS

Long Jr, Abraham. Modeling the Reliability of RAID Sets. Dell Power Solutions, May 2008.*
(Continued)

*Primary Examiner* — Jared Rutz
*Assistant Examiner* — Brendan Lillis
(74) *Attorney, Agent, or Firm* — Patent Capital Group

(57) ABSTRACT

In a system and method for a storage area network (SAN), a first controller receives a write request for a SAN and communicates with a first nested storage array module (NSAM), the first NSAM manages storage of data onto a shelf and presents the shelf as a logical unit, a buffer stores a portion of a write request from the first controller and aggregates data from the write request for the shelf, from a shelf with a second NSAM, the second NSAM provides a portion of data from the buffer to a third NSAM, the third NSAM manages storage of the portion of data from the buffer to a physical storage unit, and a second controller coupled to the first controller handles requests for the SAN in response to a failure of the first controller.

34 Claims, 9 Drawing Sheets

(51) Int. Cl.
*G06F 3/06* (2006.01)
*G06F 12/08* (2006.01)

(52) U.S. Cl.
CPC .... *G06F 2212/214* (2013.01); *G06F 2212/263* (2013.01); *G06F 2212/314* (2013.01); *Y02B 60/1225* (2013.01)

(56) References Cited

U.S. PATENT DOCUMENTS

| | | | |
|---|---|---|---|
| 5,430,859 | A | 7/1995 | Norman et al. |
| 5,680,579 | A | 10/1997 | Young et al. |
| 6,223,250 | B1 | 4/2001 | Yokono |
| 6,986,069 | B2 | 1/2006 | Oehler et al. |
| 7,171,668 | B2 | 1/2007 | Molloy et al. |
| 7,340,555 | B2 | 3/2008 | Ashmore et al. |
| 2003/0023885 | A1 | 1/2003 | Potter et al. |
| 2003/0056126 | A1 | 3/2003 | O'Connor et al. |
| 2003/0084359 | A1 | 5/2003 | Bresniker et al. |
| 2004/0230848 | A1 | 11/2004 | Mayo et al. |
| 2006/0136684 | A1* | 6/2006 | Le et al. ............ 711/154 |
| 2006/0184287 | A1 | 8/2006 | Belady et al. |
| 2007/0079068 | A1* | 4/2007 | Draggon ............ 711/114 |
| 2007/0214316 | A1 | 9/2007 | Kim |
| 2007/0250838 | A1 | 10/2007 | Belady et al. |
| 2007/0276884 | A1 | 11/2007 | Hara et al. |
| 2008/0034149 | A1 | 2/2008 | Sheen |
| 2008/0052459 | A1 | 2/2008 | Chang et al. |
| 2008/0059698 | A1 | 3/2008 | Kabir et al. |
| 2008/0168304 | A1* | 7/2008 | Flynn et al. ............ 714/7 |
| 2008/0201616 | A1* | 8/2008 | Ashmore ............ 714/57 |
| 2009/0125694 | A1* | 5/2009 | Innan et al. ............ 711/170 |
| 2009/0240873 | A1* | 9/2009 | Yu et al. ............ 711/103 |

FOREIGN PATENT DOCUMENTS

| | | |
|---|---|---|
| WO | WO94/11801 | 5/1994 |
| WO | WO2004/077214 | 9/2004 |
| WO | WO2010/037147 | 4/2010 |

OTHER PUBLICATIONS

International Search Report and Written Opinion dated Sep. 7, 2011 in related PCT Application No. PCT/US09/58905 filed Sep. 29, 2009, 7 pages.

Lewis et al., Design of an Advanced Development Model Optical Disk-Based Redundant Array of Independent Disks (RAID) High Speed Mass Storage Subsystem, Final Technical Report, 1997, pp. 1-211, U.S. Government Printing Office.

PCT Nov. 15, 2011 International Preliminary Report on Patentability from International Application PCT/US2009/058905.

"Standard RAID Levels," from Wikipedia, the Free Encyclopedia, last updated Jul. 18, 2014; 7 pages; http://en.wikipedia.org/wiki/Standard_RAID_levels.

* cited by examiner

METHOD AND SYSTEM FOR A STORAGE AREA NETWORK

CROSS REFERENCE TO RELATED APPLICATIONS

The present application claims the benefit of PCT International Application No. PCT/US09/58905, filed 29 Sep. 2009; which claims the benefit of U.S. Provisional Application Ser. No. 61/100,953, filed 29 Sep. 2008; each of which are incorporated herein by reference in their entireties.

BACKGROUND OF THE INVENTION

A wide range of industries require the fast delivery of large amounts of data. To successfully deliver large amounts of data, a storage solution must be provided that maximizes throughput and simplifies the management of storage. Approaches to handling the storage and delivery of data have relied largely relied on magnetic disk storage devices as the physical storage. Historically, however, magnetic disk storage device solutions suffer from a poor response time and latency issues due to physical and mechanical limitations of reading and writing to disk. Further, magnetic disks require substantially more power than other storage implementations. Such approaches with a poor response time and latency issues largely fail to adequately deliver large amounts of data and may lead to needless consumption of energy with the use of a magnetic disk. Thus, there is a need to provide a solution that accelerates the delivery of data and conserves energy.

BRIEF SUMMARY OF THE INVENTION

A system and method are disclosed for a storage area network. An embodiment is disclosed with a first controller operable to receive a write request for a storage area network and in communication with a first nested storage array module, the first nested storage array module operable to manage storage of data onto one or more shelves and operable to present the one or more shelves as a logical unit, a buffer operable to store a portion of a write request from the first controller and aggregating data from one or more write requests from the first controller for a shelf from the one or more shelves, the shelf from the one or more shelves with a second nested storage array module, the second nested storage array module with one or more third nested storage array modules and operable to provide a portion of data from the buffer to the one or more third nested storage array modules, the one or more third nested storage array modules operable to manage storage of the portion of data from the buffer to one or more physical storage units, and a second controller coupled to the first controller and operable to handle requests for the storage area network in response to a failure of the first controller.

Another embodiment is disclosed that receives a write request at a first controller that is in communication with a first nested storage array module and the first nested storage array module operable to manage storage of data onto one or more shelves and the first nested storage array operable to present the one or more shelves as a logical unit, stores a portion of data corresponding to a write request from the first controller in a buffer, and sends a portion of the data in the buffer to a shelf from the one or more shelves and the shelf with a second nested storage array module that has one or more third nested storage array modules and the shelf is operable to provide the portion of data from the buffer to one or more third nested storage array modules that are operable to manage storage of the portion of the data from the buffer to one or more physical storage units.

Another embodiment is disclosed that initializes one or more nested storage array modules of a shelf, combines the one or more nested storage array modules into a shelf array module for the shelf and the shelf array module presents the one or more nested storage array modules as a logical unit, loads software to enable a linear write to the shelf, loads software to enable use of a network protocol on the shelf and the network protocol to export the logical disk to a first controller, loads software for the network protocol on a first controller, combines the shelf array module with the one or more shelf array modules from one or more shelves into a first controller array module, loads software to enable use of a network protocol on the first controller, mounts a file system, and loads a network interface.

For each of the disclosed embodiments, one or more of the following features or combinations of features may apply: a second buffer coupled to the one or more third nested storage array modules and the second buffer stores a write request for the one or more physical storage units, a second controller in communication with a fourth nested storage array module and the fourth nested storage array module is operable to manage storage of data onto one or more shelves and operable to present the one or more shelves as a logical unit, a first nested storage array module with an instance of RAID5, a second nested storage array module with an instance of RAID0, a third nested storage array module with an instance of RAID5, a first nested storage array module supports redundant storage, exposing storage on one or more shelves to the first controller using Advanced Technology Attachment over Ethernet, physical storage units that are flash drives, the first nested storage array module comprises an instance of at least one of RAID0, RAID1, RAID3, RAID4, RAID5, RAID6, and a configuration that supports striping of data, the second storage array module comprises an instance of at least one of RAID0, RAID1, RAID3, RAID4, RAID5, RAID6, and a configuration that supports striping of data, the third storage array module comprises an instance of at least one of RAID0, RAID1, RAID3, RAID4, RAID5, RAID6, and a configuration that supports striping of data, the buffer comprises software, the buffer comprises hardware, and the third nested storage array module supports redundant storage.

BRIEF DESCRIPTION OF THE DRAWINGS

Illustrative embodiments are described in detail below with reference to the attached drawing figures, which are incorporated by reference herein and wherein.

DETAILED DESCRIPTION OF THE INVENTION

Figure 1A:
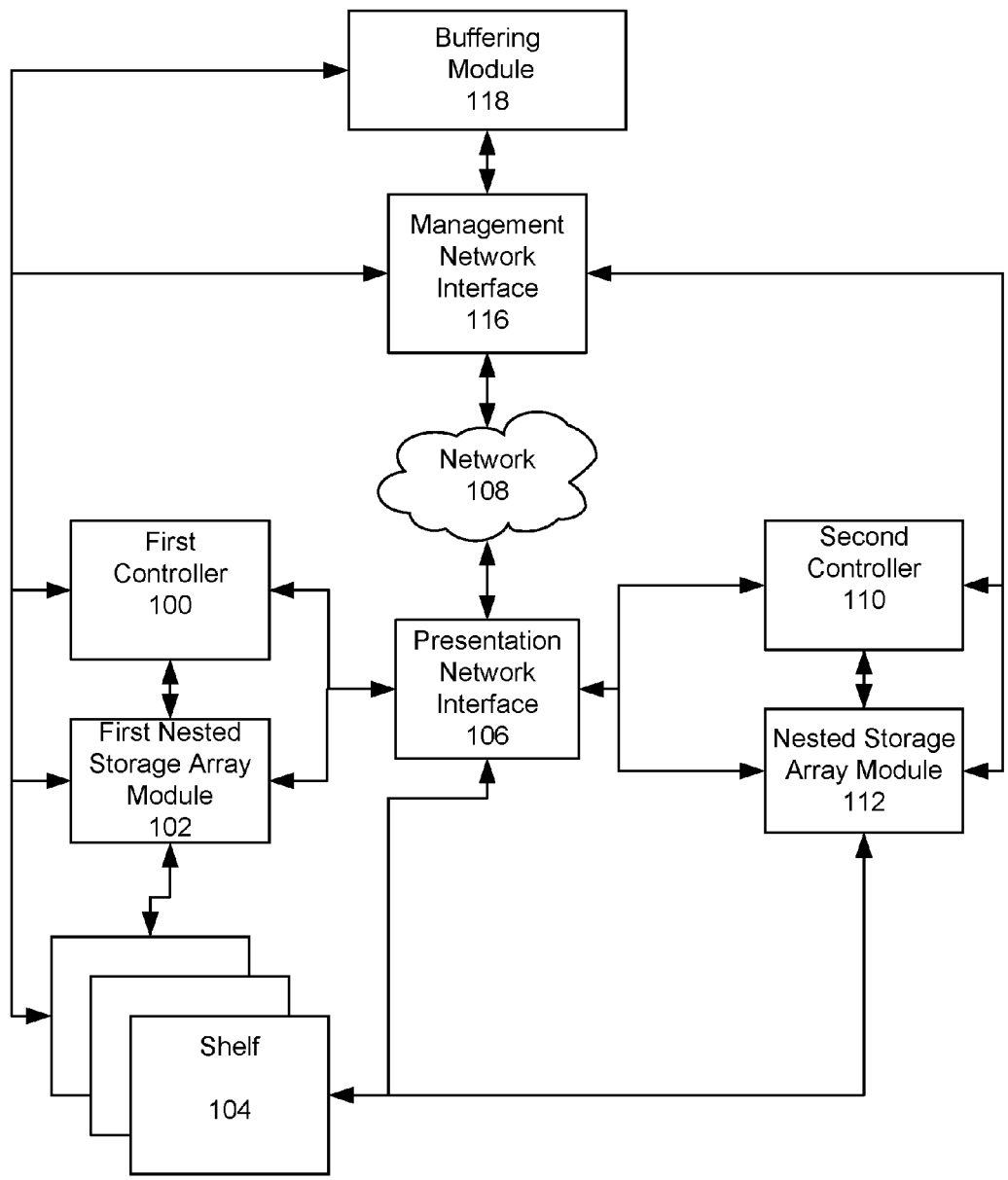
FIG. 1A depicts an embodiment of a system for implementing a storage area network in accordance with the present application.

FIG. 1A depicts an embodiment of a system for implementing a storage area network in accordance with the present application. A storage area network (SAN) may aggregate physical storage devices and/or storage arrays such that the aggregated storage appears as a logical unit to any device in communication with the SAN. A storage array is a storage scheme to aggregate one or more member storage devices (e.g. solid-state drives and/or nested storage arrays) to provide improved performance, reliability and/or greater storage space. The storage array may be implemented to divide the data into portions and write each portion of the data to a member storage device for the storage array. Additionally, the storage array may be implemented to replicate the data on member storage devices. A SAN may aggregate storage arrays for storage devices such that the aggregation appears as one local file system to any device and/or any number of servers (e.g. database servers) in communication with the SAN. In one or more embodiments, the SAN may aggregate storage arrays for solid-state drives (SSD) with flash memory or flash drives. The terms "flash drive" and "SSD" may be used interchangeably throughout. The SAN may be implemented on any number of computer systems for any number of SSDs.

The SAN may be viewed as a storage appliance with its own network connection, such as its own Ethernet. Network implementations for a SAN may include, but are not limited to, fibre channel, infiband, and high speed loop (HSL). Ethernet may be any set of networking technologies for a local area network (LAN). An element of the SAN may have an instance of an Ethernet controller or software that functions as an Ethernet controller. The Ethernet controller may provide a certain amount of bandwidth to another host system. In one or more embodiments, the storage area network may have a network switch. A network switch may be any computer networking device that connects network segments. The network switch may be dedicated to the SAN or any elements of the SAN.

Figure 1B:
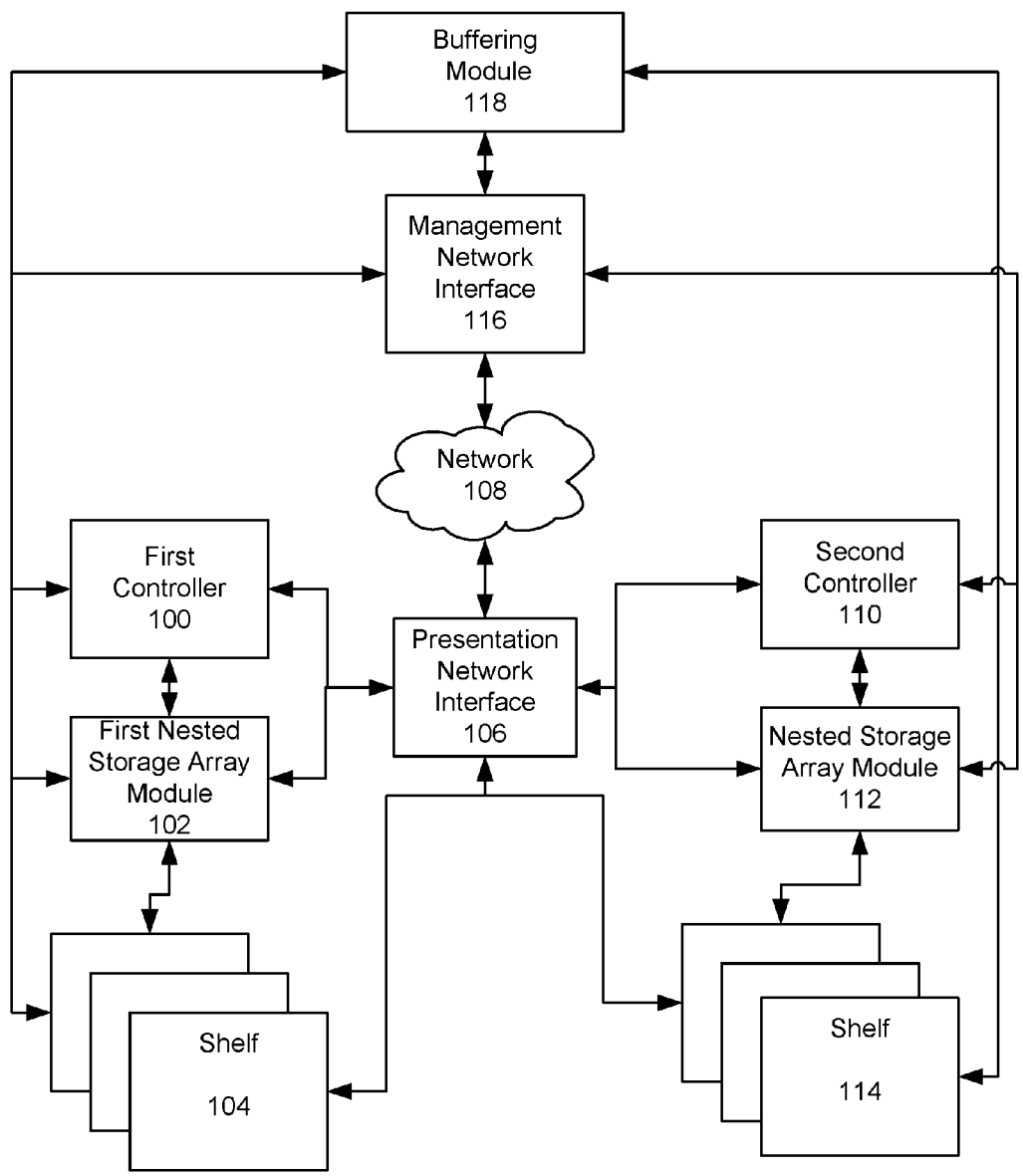
FIG. 1B depicts an embodiment of a system for implementing a storage area network in accordance with the present application.

A management network interface 116 and presentation network interface 106 are provided for communication over the network 108 between the elements of FIGS. 1A and 1B, including, but not limited to: first controller 100, first nested storage array module 102, shelf 104, second controller 110, nested storage array module 112, shelf 114 (as shown in FIG. 1B), and buffering module 118. The SAN may have a first controller 100 to serve as a primary controller for all requests received over a network switch. The first controller 100 that serves as a primary controller may receive requests for the management and/or delivery of data to and from the storage area network. In one or more embodiments, requests may be received by each controller from a dedicated network switch. The first controller may receive blocks of data to be written to the SAN with the use of a block driver. Implementations of a block driver may include, but are not limited to, a Linux block driver, a MAC block driver, or any other operating system block driver. The first controller may aggregate storage arrays and/or storage devices to present the aggregation as a logical unit.

Aggregation of storage arrays in the SAN may be achieved by nesting storage arrays. A nested storage array is a member storage array of a storage array. The first controller 100 may have a first nested storage array module 102 to manage the storage of a write request for the first controller 100. The first nested storage array module 102 may store the write request in member storage arrays that are nested storage arrays. In one or more embodiments, the first nested storage array module 102 is an instance of a Redundant Array of Independent Disks (RAID) driver. The first nested storage array module 102 may be a software and/or hardware implementation of a storage array or any combination thereof. For example, the RAID instance may be an implementation of RAID ratified by Institute of Electrical and Electronics Engineers (IEEE). For example, a RAID instance may manage one or more member disks, and present the member disks as a single disk. Similarly, a storage array module may present one or more member storage arrays as a logical unit or device. A storage array may have one or more member storage arrays, and the storage array may be unaware that the member storage arrays are storage arrays because each member storage array of the storage array is capable of presenting itself to the storage array as a logical unit or device.

RAID may be a storage array in which part of the physical storage capacity may be used to store redundant information about user data stored on the remainder of the storage capacity. The redundant information may enable regeneration of data in the event that one or more member disks of an array or the access path to the member disk fails. Embodiments of the present invention may use RAID5 for the first nested storage array module. RAID5 is an implementation of RAID that provides striping with parity data distributed across all member disks. Striping is the segmentation of logically sequential data, and the segments or portions of the data in a write request can be assigned to multiple storage devices or storage arrays. Parity indicates that a copy of the data that may be found on multiple storage devices or arrays and an additional storage device exists for retrieval of data.

The first nested storage array module 102 manages one or more shelves, designated as shelf 104 in FIG. 1, for the first controller 100. The first nested storage array module 102 may perform a first segmentation or division of the write request. A shelf 104, itself, may have one or more nested storage array modules to manage storage devices. The aggregations of shelves that have one or more nested storage array modules provide additional redundancy because data is striped across the shelves (e.g. each shelf may receive a portion of a write request after the first division of the write request data) and each shelf may provide additional striping (e.g. each shelf may further divide the portion of the write request before storing the data of the write request on the physical storage device). A shelf will be described in greater detail with FIG. 2. Each controller may interact with nested storage array modules within a shelf as though each of the nested storage array modules was a logical unit or device. The nested storage array modules may be instances of RAID that present the storage array module as a logical unit, and the management of physical storage by the storage array is abstracted from the controller and each storage array modules with a nested storage array.

A presentation network interface 106 may be used to present the logical storage of the shelves over the network 108. The presentation network interface 106 may be a software and/or hardware implementation of a network communication protocol. In one or more embodiments, the logical storage is exported from the shelves using Advanced Technology Attachment (ATA) over Ethernet (AOE). ATA is a protocol for issuing read, write, and status commands to a drive or a logical unit that presents itself as a logical drive. AOE is a network protocol that provides ATA access over the Ethernet. For example, a controller may export volume stored in the SAN to a client over 10 gb/s connections using AOE. The presentation network interface 106 implementation may include, but is not limited to, Fibre Channel Protocol (FCP), Common Internet File System (CIFS), Internet Small Computer System Interface (iSCSI), and Network File System (NFS).

In one or more embodiments, a management network interface 116 may be used to configure the elements of the SAN. For example, the management network interface 116 may be used to configure a CF flash card for a shelf and/or a CF flash card for a controller. A management network interface 116 may be a software and/or hardware implementation to provide support for a network communication protocol. Implementations of a management network interface include, but are not limited to, Internet Small Computer System Interface (iSCSI), Network File System (NFS), Distributed Replicated Block Device (DRBD), Common Internet File System (CIFS), or any other network communication or file system protocol. The management network interface 116 may be the same interface as the presentation network interface 106. The management network interface 116 may be used to provide management capability over HTTP/HTTPS, and SSH (Secure Shell). In one or more implementations, the management network interface may use a 1 gb/s connection. If there is a failure with the connection used by the presentation network interface 106, then the connection for the management network interface 116 may be used to present the logical storage over the network.

A buffering module 118 may be used to buffer blocks of data from random write requests, and buffer the data to provide the ability to perform a linear write of data. A random write is a write request with an amount of data that is not divisible by the size of an erase block for a physical SSD. If there is a remainder because the write request is not divisible by the size of an erase block, the data from the write can be buffered until there is enough data to write complete blocks instead of padding a block to be the size an erase block. The erase block may be an amount of data that may be written to a SSD due to hardware constraints, such as the lay out of the physical chips and the flash disk controller. The buffering module 118 may wait to receive enough write requests to allow for a write of an amount of data from the buffer that is divisible by the erase block of a SSD or an amount of time may have transpired that requires the data to be written. For example, the data in the buffer may be configured to "expire" after a ½ second of time has transpired and the data may be written to storage. The user may configure the time for expiration of data in the buffer.

In one or more embodiments, the buffering module 118 may be implemented within a block driver. The buffering module 118 may be software that buffers data prior to writing the data to storage. Alternatively, the buffering module 118 may intercept the writes of data before they are submitted to the storage device. Implementations of a buffering module may include, but are not limited to, Easy Co., L.L.C. Managed Flash Technology (MFT) or any other buffer implementation. In one or more embodiments, the buffering module 118 buffer may be configured to handle the limitations of the physical storage devices. For example, when using drives that have 2 MB erase blocks arranged in a RAID50, the buffer size may be configured to 2 MB per drive minus 6144 KB for the parity information.

A second controller 110 may serve as a back up for the first controller 100 and the second controller 110 may receive and service requests if there is a failure of a controller serving as a primary controller for requests. A controller may fail if hardware and/or software supporting the first controller fails or renders the controller unable to manage data properly for the logical unit. The first controller 100 may be active and receive all requests until a failure of hardware and/or software occurs with the elements providing storage management for the first controller 100, and the second controller 110 may then serve as the first controller 100 to actively service requests for the shelves 104.

In one or more embodiments, the first controller 100 and the second controller 110 may both actively receive write requests. For example, the first controller 100 and second controller 110 may share the load for read, write, status, and management requests or receive read, write, status, and management requests addressed to be handled by a particular controller. An active first controller and an active second controller will be explained further with FIG. 1B. Each controller may have an IP address or virtual IP address to ensure requests are handled by the appropriate controller.

Each controller may monitor the health of another controller. If a failure of a controller is detected, then the failed controller may be isolated from the SAN. A controller may be isolated by eliminating the receipt of power to the controller or any other method that shuts down the controller. If there is a controller failure, then the passive controller will become active and assume control of the member shelves of the first controller.

FIG. 1B depicts an embodiment of a system for implementing a storage area network in accordance with the present application. FIG. 1B depicts a system that may support an embodiment of both an active first controller 100 and active second controller 110. The first controller may serve as a primary active controller for one group of shelves 104 and the second controller may serve as a primary active controller for a different set of shelves 114.

The second controller 110 may have a nested storage array 112 that manages one or more shelves 114, designated shelf 114 in FIG. 1B. The first controller 100 may have shelves 104 dedicated to the first controller 100 and the second controller 110 may have shelves 114 dedicated to the second controller 110. Statistical analysis may be performed to determine a number of shelves that, or which shelves, storage arrays, and/or physical storage devices may be dedicated to a controller and/or shelves. The shelves 104 may provide greater throughput than the shelves 114, and the first controller 100 may receive all requests for a particular database server. All requests for a particular database server that expects to have a heavier load may send all requests to the IP address for the first controller 100.

In an embodiment, a motherboard such as Supermicro x7dbi+ motherboard and Adaptec 5805 may be used as a hardware RAID controller. Those skilled in the art will recognize that any motherboard or computer system may be used to implement a controller. A shelf may have a server chassis, such as provided by Supermicro (e.g. Supermicro sc216r900lpb). An example of an Ethernet card may be a Chelsio S320E-CXA. SSDs may be Single Layer Cell (SLC) or Multi-Layer Cell (MLC) drives, such as a Mtron 1025-64.

Although FIG. 1A and FIG. 1B depict two controllers, the use of multiple controllers is meant to illustrate an example of an implementation of the storage area network with one or more controllers, and is not meant as a limitation for the number of controllers that may be used to implement the present invention. Those skilled in the art will recognize that any number of controllers may be utilized for an implementation of the present invention.

Figure 2:
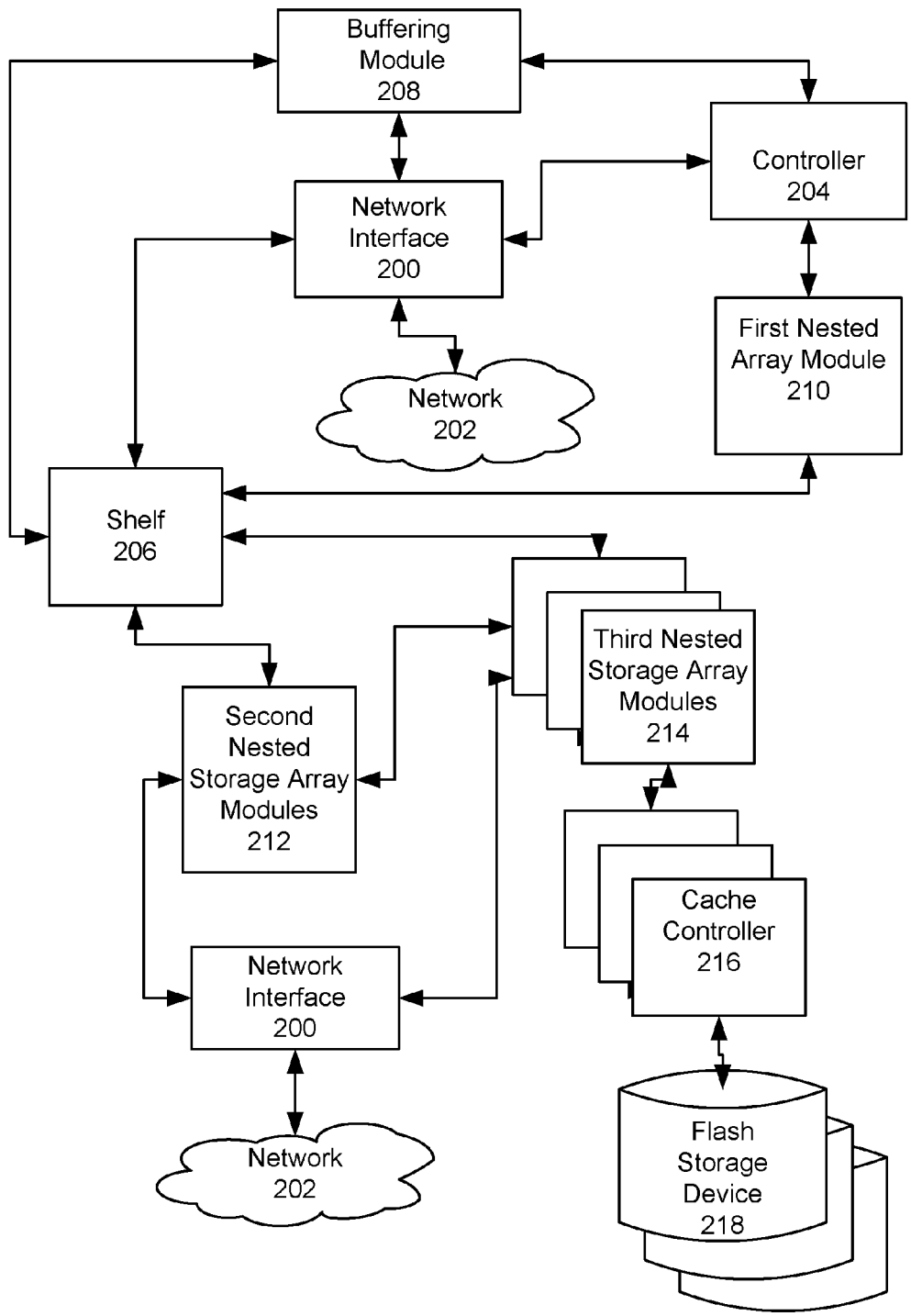
FIG. 2 depicts an embodiment of a system for implementing a storage area network in accordance with the present application.

FIG. 2 depicts an embodiment of a system for implementing a storage area network in accordance with the present application. A network interface 200 is provided for communication over the network 202 of the elements of FIG. 2, including, but not limited to: controller 204, shelf 206, buffering module 208, first nested storage array module 210, second nested storage array module 212, third nested storage array module 214, cache controller 216, and flash storage device 218. The network interface 200 may be a software and/or hardware implementation that provides support for a network protocol and/or any type of communication protocol. In one or more embodiments, a buffering module 208 may be used to buffer or store data to allow for a linear write to a storage array and/or physical storage.

A controller 204 may service requests, such as write, read, status and management requests for the storage area network received from the network interface and/or from the buffering module 208. The controller 204 may have one or more first nested storage array modules 210 and one or more shelves, designated shelf 206. Although FIG. 2 depicts a controller with a first nested storage array and a shelf for illustrative purposes, those skilled in the art will recognize that any number of controllers 204, first nested storage array modules 210, and/or shelves 206 may be used to implement a SAN.

A shelf 206 may have one or more second nested storage array modules 212 for the first nested storage array module 210. The second nested storage array modules 212 may be nested under the first nested storage array module 210. In one or more embodiments, the first nested storage array module is an instance of RAID 5 and the second nested storage array module is an instance of RAID 0. RAID 0 stripes data stored in the buffering module across member storage devices and/or arrays without redundancy. The second nested storage array module 210 may present itself as a logical unit or device to the first nested storage array module 210 with the use of a network interface 200.

The second nested storage array modules 212 may have third nested storage array modules 214. In one or more embodiments, the first nested storage array module is an instance of RAID 5, the second nested storage array module is an instance of RAID 0, and the third nested storage array module 214 is an instance of RAID 5 for one or more SSDs of flash memory, illustrated as Flash Storage Device 218.

In one or more embodiments, one or more cache controllers 216 may be used to provide a cache or a second buffer for the flash storage devices 218. A cache controller 216 may provide cache capability for each flash storage device 218 in the SAN or a second buffer for the data to be written to the flash storage device 218. An embodiment may implement a cache controller as an instance of a controller for Serial Advanced Technology Attachment (SATA), a computer bus designed for the transfer of data between a motherboard and a mass storage device. Another embodiment may implement a cache controller as a Serial Attached SCSI (SAS) controller, a data transfer technology designed to move data to and from computer storage devices. In one or more embodiments, the cache controller 216 may reorder the data that is written to storage. In another embodiment, the cache controller 216 may buffer the data without reordering the data written to storage. Embodiments may rely on a battery-backed cache to protect the SAN from data inconsistencies resulting from a loss of power of a cache that has not written the contents of the cache. Another embodiment may write the contents of a buffer immediately and may not be battery-backed.

Figure 3:
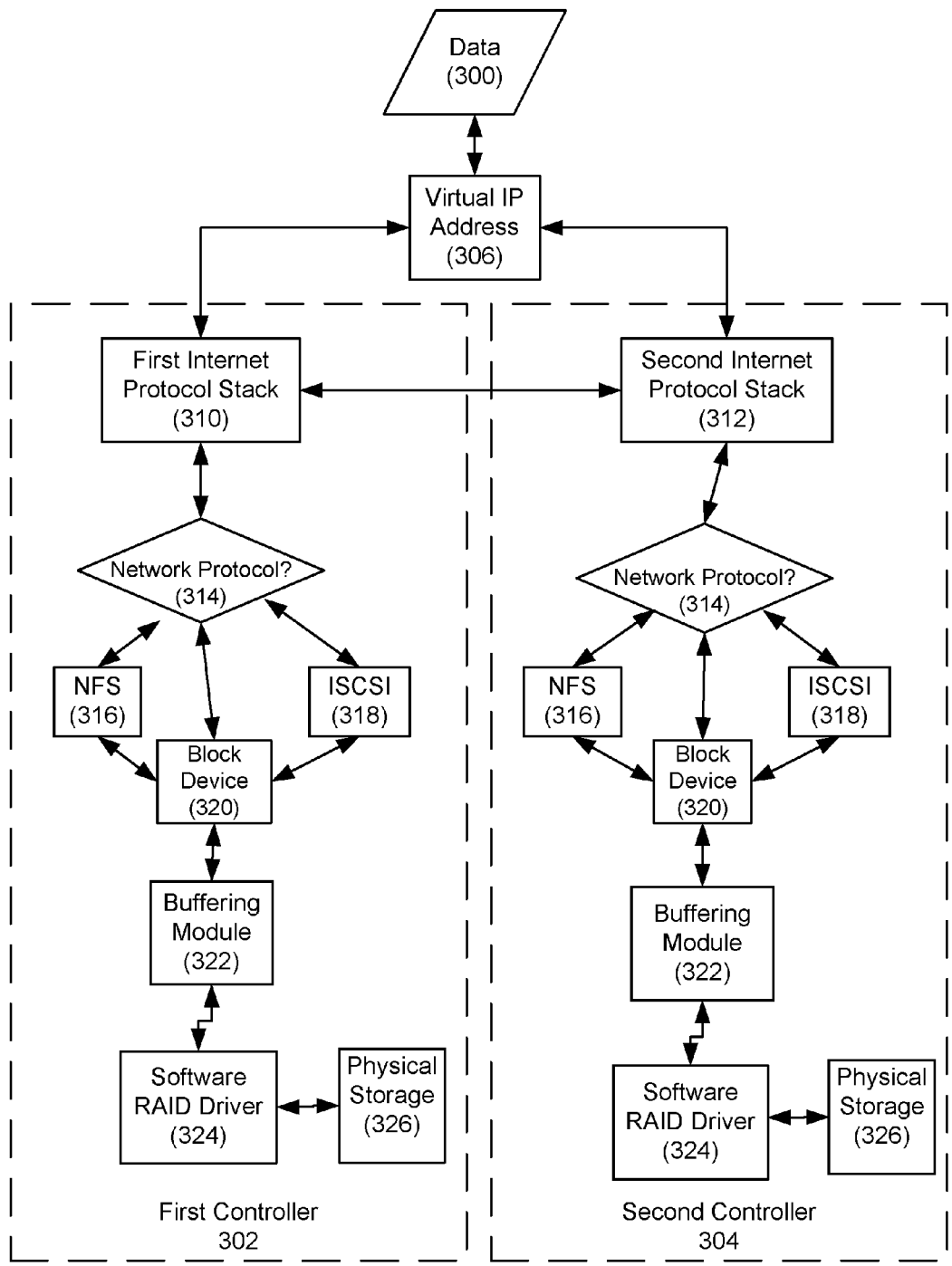
FIG. 3 is a flow chart for implementing an embodiment of a storage area network in accordance with the present application.

FIG. 3 is a flow chart for implementing an embodiment of a storage area network in accordance with the present application. Initially, a request for a SAN may be received over a network. The request may be a request to write data (300) in the storage network. Embodiments may use the Internet Protocol (IP) to communicate the data (300) and requests across a packet-switched network using the Internet Protocol Suite (TCP/IP). A virtual IP address (VIP) (306) may be used to deliver the requests to the first controller (302) or the second controller (304), depending on which controller has not experienced a hardware and/or software failure. A VIP is an IP address that does not identify a specific computer or network interface card.

If the first controller (302) is active, then the first controller may receive the write request. If the second controller is active, then the second controller (304) may receive the write request. In one or more embodiments, the write request will be received at the IP stack, either the first IP stack (310) or the second IP stack (312), of the controller that is active and has not had a hardware and/or software failure. In another embodiment, the first controller or second controller are both active and receive requests for IP or VIP addresses that are supported by the particular controller. The SAN may not have had a failure of either controller and the first controller may remain active servicing requests until there is a failure at the first controller.

Next, hardware and/or software providing support for one or more network protocols may be provided to handle requests for the SAN and the appropriate network protocol support may be determined (314) at both controllers. By way of example, the following protocols are depicted in FIG. 3: a NFS daemon (316), ISCSI daemon (318) or a block device (320).

A block device (320) may allow software to interact with a device driver with standard input/output system calls. In one or more embodiments, the request may be sent to the second controller, an active controller in the SAN, because the SAN is an active first controller/active second controller implementation or the first controller had a failure. The request may be provided to an element of an active controller. For example, the request may be sent to the block device (320) or the internet protocol stack, depicted in FIG. 2 as the second internet protocol stack (312), of the active controller.

Next, random write requests may be buffered in a buffering module (322). The random write requests may be buffered to enable a linear write to storage. In one or more embodiments, the linear write of data is performed when the buffer is full or the data is in the buffer has been in the buffer for a designated period of time (e.g. data has expired). In one or more embodiments, the buffering module may attempt to only write forward across the disk, even if there are changes to data that has previously been written to storage. The data written to storage that is no longer valid may be marked as dirty, and the dirty data may be cleaned up or designated to be overwritten. The storage array may write to all the storage managed by the array before attempting to write over dirty data. The linear write may be provided to a software RAID driver (324) and the RAID driver (324) may write data so that it is redundantly stored in physical storage managed by nested storage arrays. In one or more embodiments, the data on the physical storage (326) (e.g. SSDs) may be reordered to ensure that the storage is efficiently written to the physical storage.

In one or more embodiments, the size of the buffer in the buffering module is the size of an erase block of a physical flash drive (e.g. SSD)*the size of the number of active drives in a shelf.

Figure 4:
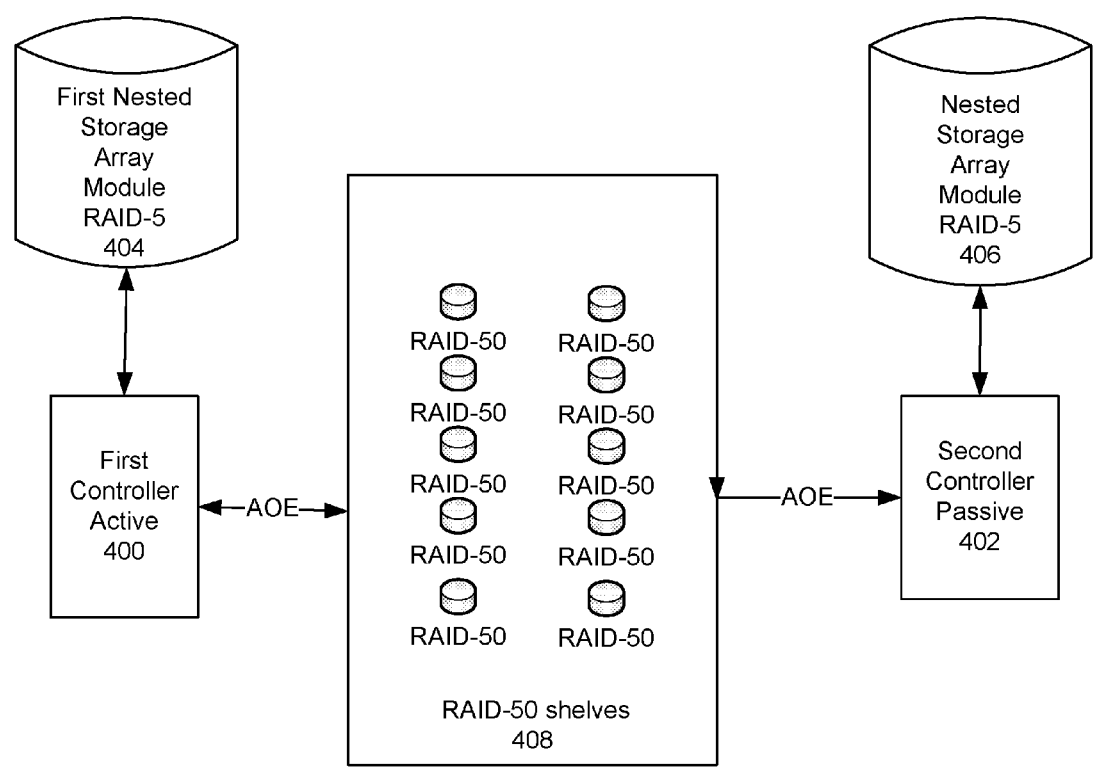
FIG. 4 depicts an embodiment of a system for implementing a storage area network in accordance with the present application.

FIG. 4 depicts an embodiment of a system for implementing a storage area network in accordance with the present application. A first controller 400 is designated as "active" and will be the primary controller for requests for the SAN depicted in FIG. 4. The first controller 400 is associated with a first nested storage array module 404. The first nested storage array module 404 is implemented as an instance of RAID 5. The first controller 400 may have a driver for RAID 5 installed on the first controller 400. In one or more embodiments, the first controller may have a RAID 6 driver installed. The first controller 400 communicates with the shelves 408 that support the first controller 400. The shelves 408 are implemented as nested storage arrays with an instance of RAID5 and RAID0 running on each shelf. The first controller 400 and/or first nested storage array module communicates with the shelves 408 using AOE. For example, the storage volume of the shelves may be exported to the first controller using AOE, FCP, and/or iSCSI.

The second controller 402 is designated as "passive" in the system depicted in FIG. 4 and is monitoring the health of the first controller 400. In an embodiment, if the second controller was designated as "active" in an active first controller and active second controller implementation, then the second controller may have a nested storage array module 406 (e.g. an instance of RAID 5). The second controller 402 may remain passively receiving data until enough hardware/software that supports for first controller fails to warrant the second controller to receive requests for the SAN. In an embodiment, the delay in servicing requests by the first controller may determine whether the first controller may be designated passive and the second controller should be actively receiving requests. In another embodiment, another controller may be utilized if a significant number of hardware/software failures occurred with either controller.

The SAN depicted in FIG. 4, with a first controller with 10 supporting shelves may lose 1 shelf and 8 supporting disks from each of the remaining shelves before the SAN may fail. Each shelf as depicted, for example, may lose three SSDs provided that the drives are not all member storage devices of the same third nested array module.

Figure 5:
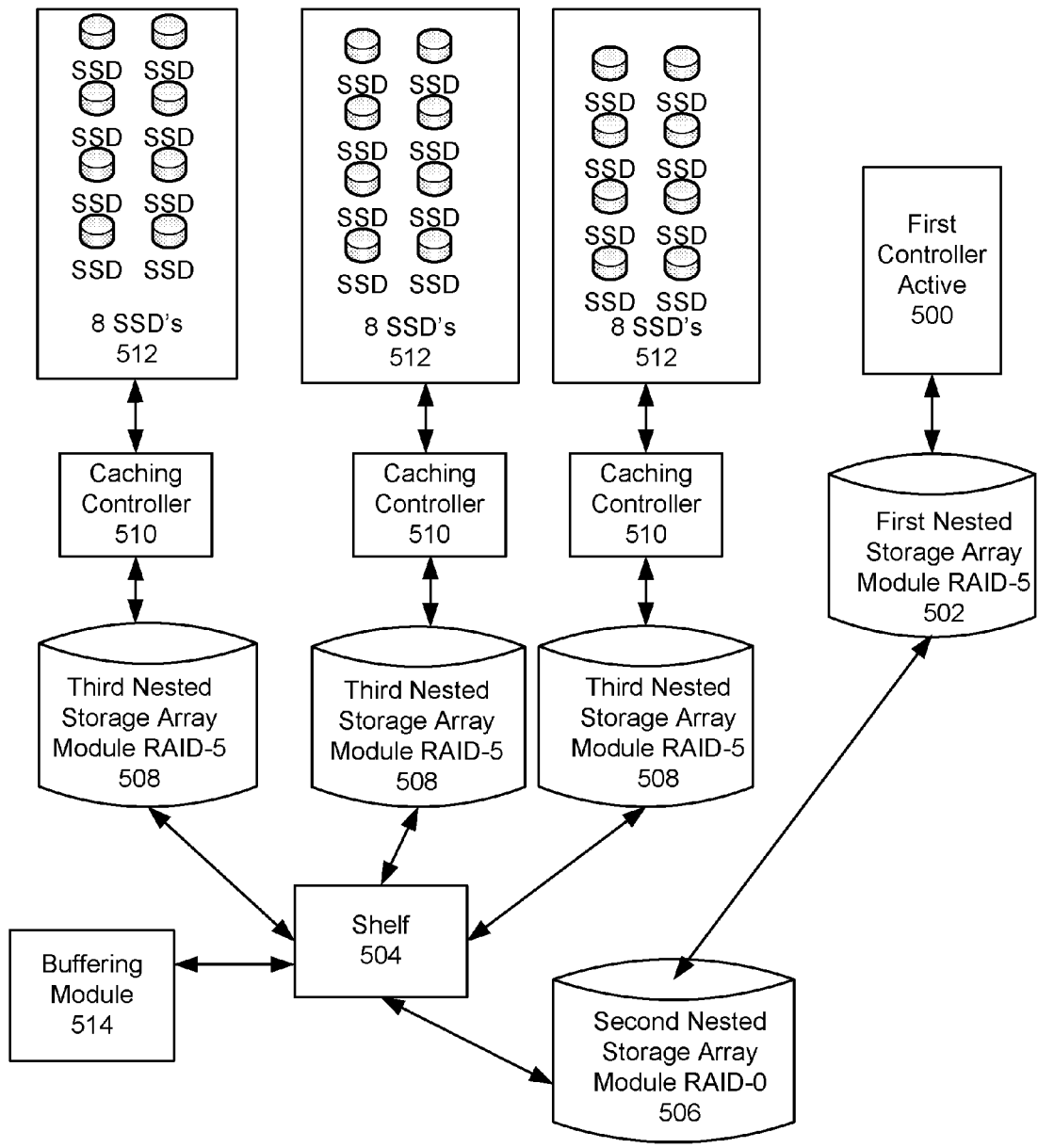
FIG. 5 depicts an embodiment of a system for implementing a storage area network in accordance with the present application.

FIG. 5 depicts an embodiment of a system for implementing a storage area network in accordance with the present application. A single controller, first controller designated as "active" 500, and a single shelf 504 are depicted in FIG. 5 for illustrative purposes. Those skilled in the art will recognize that systems may have any number of shelves and controllers. The first controller 500 is associated with a first nested storage array module 502. The first controller 500 may have an instance of a RAID 5 driver for the first nested storage array module 502. The first nested storage array module 502 may be associated with a second nested storage array module 506 of shelf 504.

The second nested storage array module 506 may be implemented as RAID 0. A RAID 0 driver for the second nested storage array module 506 may be installed on the shelf 504. The shelf may have buffering module 514 with a buffer for storing portions of write requests before the requests are written to the SSDs. The shelf may have one or more instances of RAID 5 nested (508) under the RAID 0 instance. RAID 0 stripes the data from the buffer of the buffering module 514 received and does not provide redundancy. The RAID 5 implementation may receive the stripe of data provided by the RAID 0 implementation and redundantly store the stripe of data. In one or more embodiments, a cache controller 510 may be used to support the SAN by providing support for each SSD 512. In one or more embodiments, the cache controller may provide a buffer for the data written for a storage array. Next, data is written to the physical storage, depicted as three sets of eight SSDs 512

Figure 6:
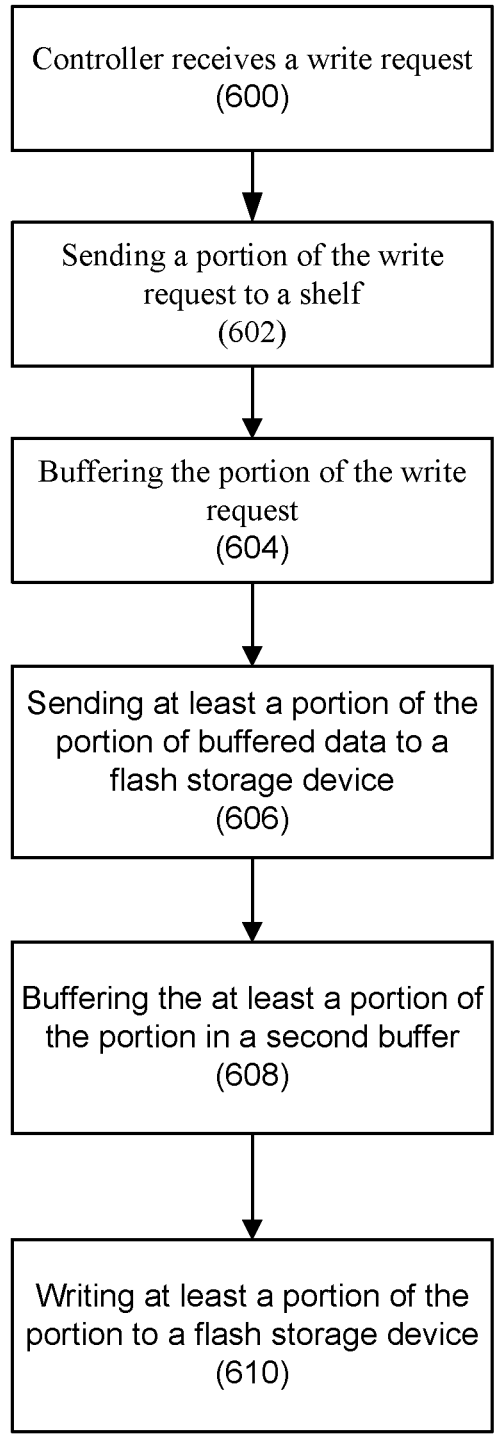
FIG. 6 is a flow chart for implementing an embodiment of a storage area network in accordance with the present application.

FIG. 6 is a flow chart for implementing an embodiment of a storage area network in accordance with the present application. Initially, a write request may be received for a storage area network (600). In one or more embodiments, the random write request is pushed on to an IP stack for a controller, such as an IP Linux stack implementation. Depending on the communication protocol used for the request, a daemon for the communication protocol may be used to create a storage write request.

The first controller communicates with a first nested storage array module, such as a RAID 5 driver. The first nested storage array module manages the storage of the write request onto one or more shelves. For example, if the RAID 5 driver supports 10 shelves, the data for the write request will be split or divided into 9 portions (i.e., also known as striping), one portion for each of nine shelves and parity information may be sent to a tenth shelf. In a storage array module implementation, all shelves may receive write requests for data and/or parity information, and the shelves may rotate in the receipt of parity information. For example, in a RAID 5 implementation, the parity information may not be dedicated to be received by a particular shelf, such that the parity information for the system may be distributed among the 10 shelves according to a rotation. The rotation can be a random rotation or a predetermined rotation. The first nested storage array module supports striping, and may or may not include parity, depending on the RAID or other implementation of the storage array module. The storage array module may also present the one or more shelves as a logical disk or logical unit.

Next, a write request is generated by the first controller and sent, together with the data, to a shelf (602). The write request is buffered (604) before the second nested storage array, for example, before the RAID 0 level. Other RAID implementations may be used in place of the RAID 0, such as, for example, RAID 1, RAID 3, RAID 4, RAID 5 or RAID 6, or any other configuration that supports data striping may be used. The write requests from the first controller may be random. The random write request(s) may be buffered to improve performance, increase efficiency and increase lifecycle of the storage media, such as, for example, flash drives, but buffering is not necessary. The size of the buffering is based on the erase block size of each of the physical storage units, such as, for example, the flash drives. In one or more embodiments, a random write request is sent to an MFT driver to be buffered. The buffering can be provided in the form of software or hardware, such as, for example, as a custom field programmable gate array (FPGA). The buffer provides for reordering of partly invalidated data blocks. This may be accomplished by combining the valid portions of partly invalidated data blocks and rewriting the combined valid data blocks. This also provides for improved cycling of the physical storage units and improves performance and lifecycle of the units, such as, for example, flash drives. A plurality of random write requests may be buffered to form an erase block divisible write request to be sent to all of the third nested storage arrays for writing erase block groups of data to each of the physical storage units. A buffer at each of the third nested storage arrays is used to buffer the stripe of data that is part of the write request. Each stripe of data that is sent to each of the third nested storage arrays is equal or near equal in size to an erase block group of data times the number of physical storage units comprising the third nested storage array. The buffer may be implemented in the form of hardware, with battery backup, to ensure integrity of the data when the buffer provides for reordering blocks of data. Alternatively, the buffer may not provide for reordering of data, in which case, the buffer may commit in exact or near exact erase block sizes and may be keyed by the write command from the upstream buffer.

Each shelf may have a first buffer comprised of software or dedicated hardware that is located just prior to the next storage level, i.e., the second nested storage array module. The second nested storage array module is able to provide at least a portion of the data in the buffer to the third nested storage array module. The second nested array module may be an implementation of a RAID 0 driver and provide striping. For example, the second nested array module may have three member storage arrays, such as three RAID 5 storage arrays, and the second nested storage array module may provide a copy of the portion of the data in the buffer to each of the three storage arrays of the RAID 0 implementation. Alternatively, as described above, the second nested storage array module can be any RAID configuration that supports striping or any other configuration that supports striping of data.

Next, at least a subset of the portion of the data in the buffer is sent to a flash storage device (606) as a result of striping. The third nested storage array module, such as an implementation of RAID 5, may manage storage of at least the portion of the portion of the buffered data onto one or more flash drives (e.g. SSDs). The third nested storage array module may offer striping and parity such that each portion of a portion of the buffered data is stored redundantly. For example, each portion of a portion of the buffered data may be stored on seven flash drives (e.g., SSDs) and the parity information may be stored on an eighth flash drive (e.g., SSD).

The at least a portion of the portion of the buffered data may be buffered in a second buffer (608) to ensure that no data may be lost in the event of a power loss. And, the at least a portion of the portion of the buffered data may be written to the flash storage device (610).

Figure 7:
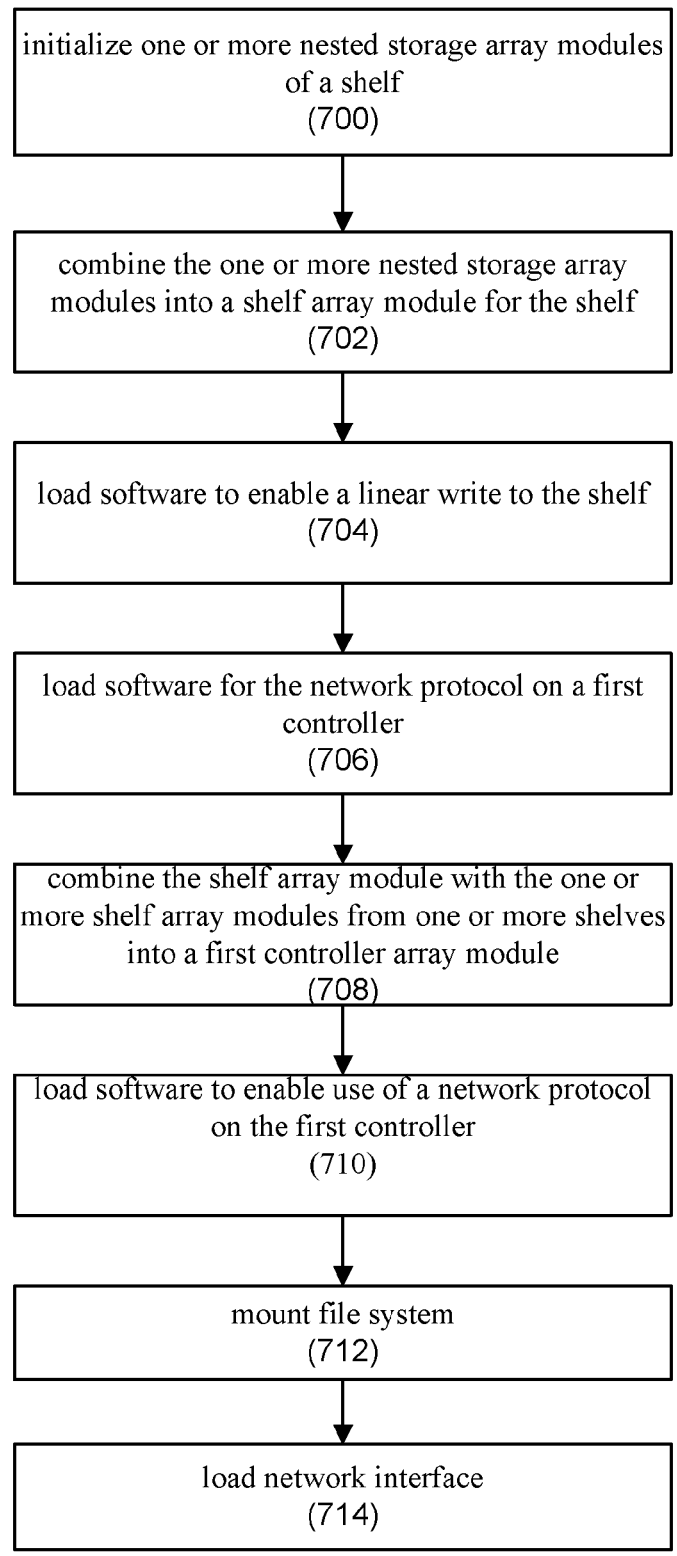
FIG. 7 is a flow chart for implementing an embodiment of a storage area network in accordance with the present application.

FIG. 7 is a flow chart for implementing an embodiment of a storage area network in accordance with the present application. In one or more embodiments, a SAN may be initialized with a boot script. The boot scripts for a controller and a shelf may be stored in a compact flash (CF) card and the system may be booted from the CF card. The CF card boot may be an implementation of an Integrated Drive Electronics (IDE) interface. The boot script may be run when the computer system is powered on using a standard BIOS configuration. One or more nested storage array modules of a shelf may be initialized (700). Next, the one or more nested storage array modules may be combined into a shelf array module for the shelf (702). The shelf array module may present the one or more nested storage array modules as a logical disk. Software may be loaded to enable a linear write to the shelf (704). Next, software may be loaded to enable use of a network protocol on a first controller (706). The network protocol may provide for the ability to export the logical disk to a first controller. The shelf array module is combined with the one or more shelf array modules from one or more shelves into a first controller array module (708). Next, software is loaded for the network protocol on a first controller (710). Next, a file system is mounted (712). A network interface is then loaded to the controller (714). Examples of network interfaces or storage presentation protocols that may be implemented include, but are not limited to, SCSI, NFS, and CIFS.

Figure 8:
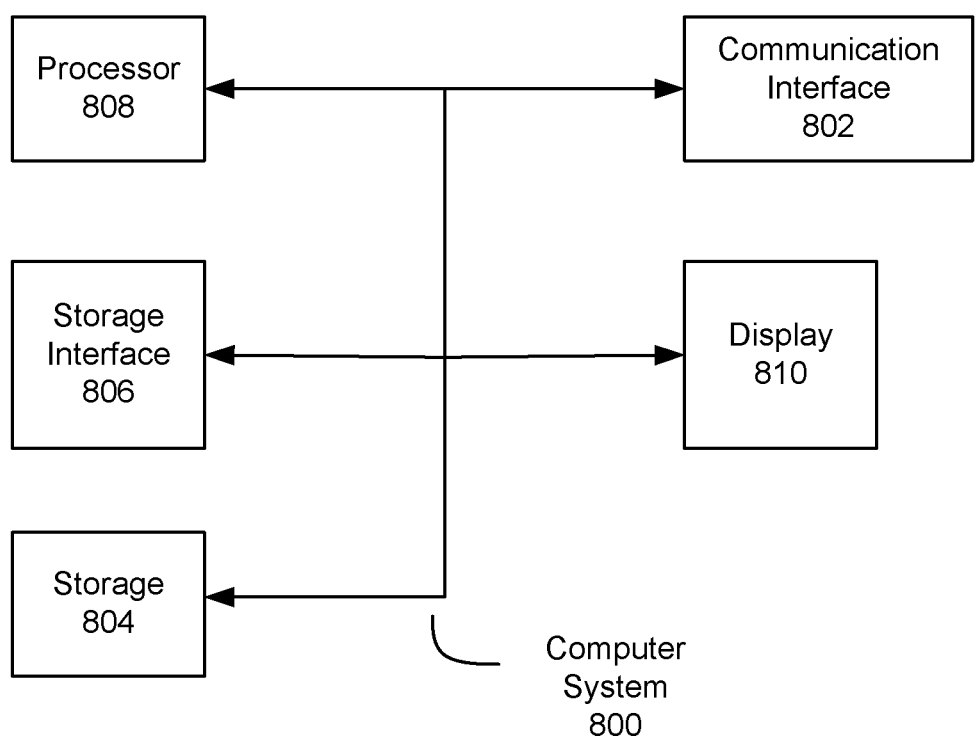
FIG. 8 depicts a system architecture for a computer system according to the present application.

FIG. 8 depicts a system architecture for a computer system according to the present application. The execution of instructions required to practice the invention may be performed by any number of computer systems 800 as depicted in FIG. 8. As used herein, the term computer system is broadly used to describe any computing device that can store and independently run one or more programs, applications, scripts, or software processes. Implementations of the present invention may have a single computer system 800 or any number of computer systems 800.

Computer systems 800 may communicate with other computer systems/devices with any number of Communication Interface(s) 802. The Communication Interface 802 may provide the ability to transmit and receive signals, such as electrical, electromagnetic or optical signals, that include data streams representing various types of information (e.g. messages, communications, instructions, and data). The Communication Interface 802 may provide an implementation for a communication protocol, such as a network protocol. Instructions may be executed by a Processor 808 upon receipt and/or stored in Storage 804 accessible to the Computer System 800

Storage 804 may be accessed by the Computer System 800 with a Storage Interface 806. The Computer System 800 may use the Storage Interface 806 to communicate with the Storage 804. The Storage Interface 806 may include a bus coupled to the storage and able to transmit and receive signals. Storage 804 may include random access memory (RAM) or other dynamic storage devices, for storing dynamic data and instructions executed by the Processor 808. Any number of Processor(s) 808 may be used to execute instructions for the Computer System 800. Storage may include, but is not limited to, read only memory (ROM), magnetic disks, flash drives, usb drives, and optical disks. In one or more embodiments, a Computer System 800 may be connected to a Display 810 for displaying information to a user.

"Computer usable medium" or "Computer readable medium" refers to any medium that provides information or may be used by a Processor 808. Medium may include volatile and non-volatile storage mediums.

As these and other variations and combinations of the features discussed above can be utilized without departing from the present application as defined by the claims, the foregoing description of the preferred embodiment should be taken by way of illustration rather than by way of limitation of the invention set forth in the claims.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

The invention claimed is:

1. A system for a storage area network, comprising:
a first controller operable to receive a write request for the storage area network, the first controller in communication with a first nested storage array module, the first nested storage array module operable to manage storage of data using a configuration that supports striping of data across a plurality of shelves, each shelf of the plurality of shelves comprising one or more storage arrays, each storage array of the one or more storage arrays comprising a plurality of physical storage units, the first nested storage array module operable to present the plurality of shelves as a logical unit and wherein the configuration that supports striping of data across the plurality of shelves includes providing parity information for at least one stripe of data to at least one of the plurality of shelves;

a buffer operable to store a portion of a write request from the first controller, the buffer aggregating data from one or more write requests from the first controller for a shelf from the plurality of shelves and reordering of one or more partly invalidated blocks of data from the one or more write requests from the first controller by combining valid portions of the partly invalidated blocks and rewriting one or more valid blocks of data;

the shelf from the plurality of shelves comprising a second nested storage array module, the second nested storage array module comprising one or more third nested storage array modules and operable to provide a portion of data from the buffer to the one or more third nested storage array modules, the one or more third nested storage array modules operable to manage storage of the portion of data from the buffer to a plurality of physical storage units for a storage array of the shelf; and a second controller coupled to the first controller and operable to monitor health of the first controller and to handle any write requests for the storage area network in response to a failure of the first controller.

2. The system of claim 1, wherein the buffer is a first buffer and further comprising:
a second buffer coupled to the one or more third nested storage array modules, wherein the second buffer stores a write request for the plurality of physical storage units for the one or more storage arrays of the shelf.

3. The system of claim 1, wherein the second controller is in communication with a fourth nested storage array module, the fourth nested storage array module operable to manage storage of data onto a plurality of shelves, and the fourth nested storage array module operable to present the plurality of shelves as a logical unit.

4. The system of claim 1, wherein the first nested storage array module comprises an instance of RAID5.

5. The system of claim 1, wherein the second nested storage array module comprises an instance of RAID0.

6. The system of claim 1, wherein the third nested storage array module comprises an instance of RAID5.

7. The system of claim 1, wherein the first nested storage array module supports redundant storage.

8. The system of claim 1, wherein the first nested storage array module comprises an instance of at least one of RAID0, RAID1, RAID3, RAID4, RAID5, RAID6.

9. The system of claim 1, wherein the second storage array module comprises an instance of at least one of RAID0, RAID1, RAID3, RAID4, RAID5, RAID6, and a configuration that supports striping of data.

10. The system of claim 1, wherein the third storage array module comprises an instance of at least one of RAID0, RAID1, RAID3, RAID4, RAID5, RAID6, and a configuration that supports striping of data.

11. The system of claim 1, wherein the third nested storage array module supports redundant storage.

12. The system of claim 1, further comprising:
exposing storage on the plurality of shelves to the first controller using Advanced Technology Attachment over Ethernet.

13. The system of claim 1, wherein the plurality of physical storage units are flash drives.

14. The system of claim 1, wherein the buffer comprises software or hardware.

15. The system of claim 14, wherein the hardware is a field programmable gate array (FPGA).

16. The system of claim 1, wherein the at least one shelf that is to receive parity information for each stripe is rotated among the plurality of shelves for each of the plurality of stripes.

17. The system of claim 2, wherein the second buffer comprises hardware.

18. The system of claim 2, wherein the second buffer includes a backup battery.

19. A method for a storage area network, comprising:
receiving a write request at a first controller, the first controller in communication with a first nested storage array module, the first nested storage array module operable to manage storage of data using a configuration that supports striping of data across a plurality of shelves, each shelf of the plurality of shelves comprising one or more storage arrays, each storage array of the one or more storage arrays comprising a plurality of physical storage units, the first nested storage array module operable to present the plurality of shelves as a logical unit and wherein the configuration that supports striping of data across the plurality of shelves includes providing parity information for at least one stripe of data to at least one of the plurality of shelves;

storing a portion of data corresponding to a write request from the first controller in a buffer;

reordering one or more partly invalidated blocks of data from one or more write requests from the first controller by combining valid portions of the partly invalidated blocks of data and rewriting one or more valid blocks of data; and sending a portion of data in the buffer to a shelf from the plurality of shelves, the shelf comprising a second nested storage array module, the second nested storage array module comprising one or more third nested storage array modules and operable to provide the portion of data from the buffer to one or more third nested storage array modules, the one or more third nested storage array modules operable to manage storage of the portion of data from the buffer to a plurality of physical storage units for a storage array of the shelf.

20. The method of claim 19, wherein the buffer is a first buffer and further comprising:
buffering some of the portion of data from the first buffer in a second buffer.

21. The method of claim 19, further comprising receiving a write request at a second controller, the second controller in communication with a fourth nested storage array module, the fourth nested storage array module operable to manage storage of data onto a plurality of shelves, and the fourth nested storage array module operable to present the plurality of shelves as a logical unit.

22. The method of claim 19, wherein the first nested storage array module comprises an instance of at least one of RAID0, RAID1, RAID3, RAID4, RAID5, and RAID6.

23. The method of claim 19, wherein the second storage array module comprises an instance of at least one of RAID0, RAID1, RAID3, RAID4, RAID5, RAID6, and a configuration that supports striping of data.

24. The method of claim 19, wherein the third storage array module comprises an instance of at least one of RAID0, RAID1, RAID3, RAID4, RAID5, RAID6, and a configuration that supports striping of data.

25. The method of claim 19, wherein the third nested storage array module supports redundant storage.

26. The method of claim 19, further comprising:
exposing storage on the plurality of shelves to the first controller using Advanced Technology Attachment over Ethernet.

27. The method of claim 19, wherein the plurality of physical storage units are flash drives.

28. The method of claim 19, wherein the buffer comprises software or hardware.

29. The method of claim 28, wherein the hardware is a field programmable gate array (FPGA).

30. The method of claim 20, wherein the second buffer comprises hardware.

31. The method of claim 20, wherein the second buffer includes a backup battery.

32. The system of claim 1, wherein the first nested storage array module comprises an instance of RAID5, the second nested storage array module comprises an instance of RAID0, and the third nested storage array module comprises an instance of RAID5.

33. The system of claim 1, wherein the first nested storage array module comprises an instance of at least one of RAID0, RAID1, RAID3, RAID4, RAID5, RAID6, the second nested storage array module comprises an instance of at least one of RAID0, RAID1, RAID3, RAID4, RAID5, RAID6, and the third nested storage array module comprises an instance of at least one of RAID0, RAID1, RAID3, RAID4, RAID5, RAID6.

34. One or more non-transitory computer readable media comprising instructions for execution that when executed by a processor are operable to perform operations for a storage area network, the operations comprising:

receiving a write request at a first controller, the first controller in communication with a first nested storage array module, the first nested storage array module operable to manage storage of data using a configuration that supports striping of data across a plurality of shelves, each shelf of the plurality of shelves comprising one or more storage arrays, each storage array of the one or more storage arrays comprising a plurality of physical storage units, the first nested storage array module operable to present the plurality of shelves as a logical unit and wherein the configuration that supports striping of data across the plurality of shelves includes providing parity information for at least one stripe of data to at least one of the plurality of shelves;

storing a portion of data corresponding to a write request from the first controller in a buffer;

reordering one or more partly invalidated blocks of data from one or more write requests from the first controller by combining valid portions of the partly invalidated blocks of data and rewriting one or more valid blocks of data; and sending a portion of data in the buffer to a shelf from the plurality of shelves, the shelf comprising a second nested storage array module, the second nested storage array module comprising one or more third nested storage array modules and operable to provide the portion of data from the buffer to one or more third nested storage array modules, the one or more third nested storage array modules operable to manage storage of the portion of data from the buffer to a plurality of physical storage units for a storage array of the shelf.

* * * * *